US012555218B2

(12) United States Patent
Ekawa et al.

(10) Patent No.: US 12,555,218 B2
(45) Date of Patent: Feb. 17, 2026

(54) CLASSIFICATION CONDITION SETTING SUPPORT APPARATUS

(71) Applicant: OMRON Corporation, Kyoto (JP)

(72) Inventors: Koichi Ekawa, Kyoto (JP); Saori Yasui, Muko (JP)

(73) Assignee: OMRON CORPORATION, Kyoto (JP)

( * ) Notice: Subject to any disclaimer, the term of this patent is extended or adjusted under 35 U.S.C. 154(b) by 508 days.

(21) Appl. No.: 18/146,575

(22) Filed: Dec. 27, 2022

(65) Prior Publication Data

US 2023/0237640 A1 Jul. 27, 2023

(30) Foreign Application Priority Data

Jan. 24, 2022 (JP) .................................. 2022-009006

(51) Int. Cl.
*G06T 7/00* (2017.01)
*G06V 10/764* (2022.01)

(52) U.S. Cl.
CPC .......... *G06T 7/0004* (2013.01); *G06V 10/764* (2022.01)

(58) Field of Classification Search
CPC ........ G06T 7/0004; G06T 2207/20092; G06V 10/764; G06V 10/7788; G06V 10/87; G01N 21/88; G01N 21/8851; G01N 2021/8854; G01N 2021/888; G01N 2021/8887
USPC ................................................. 382/100, 141
See application file for complete search history.

(56) References Cited

U.S. PATENT DOCUMENTS

| 2004/0228515 A1* | 11/2004 | Okabe ................... G06T 7/0004 382/145 |
| 2006/0215902 A1 | 9/2006 | Shibuya |
| 2007/0047800 A1* | 3/2007 | Hiroi ..................... H01J 37/222 382/149 |

(Continued)

FOREIGN PATENT DOCUMENTS

| CN | 112213315 A | 1/2021 |
| JP | 2006266872 A | 10/2006 |

(Continued)

OTHER PUBLICATIONS

Extended European Search Report issued in European Appln. No. 23150002.6 mailed Jun. 19, 2023.

(Continued)

*Primary Examiner* — Sheela C Chawan
(74) *Attorney, Agent, or Firm* — ROSSI, KIMMS & McDOWELL LLP

(57) ABSTRACT

Provided is a classification condition setting support apparatus including: a basic information storage unit configured to store basic information including basic imaging information and a basic defect type; a classification condition setting unit; a basic defect type classification unit configured to classify the basic imaging information according to the classification condition; a classification result confirmation screen generator configured to generate a classification result confirmation screen including the number of pieces of classification basic imaging information, the basic defect type associated with the classification basic imaging information, and the number of pieces of correct answer basic imaging information, by classifying the target basic imaging information according to the classification condition; and a display unit.

6 Claims, 5 Drawing Sheets

(56) References Cited

U.S. PATENT DOCUMENTS

| | | | |
|---|---|---|---|
| 2008/0075352 A1* | 3/2008 | Shibuya | G01N 21/9501 |
| | | | 382/141 |
| 2010/0195896 A1 | 8/2010 | Shibuya | |
| 2011/0164809 A1 | 7/2011 | Shibuya | |
| 2013/0077850 A1* | 3/2013 | Hirai | G06T 7/0004 |
| | | | 382/149 |

FOREIGN PATENT DOCUMENTS

| JP | 2009103508 A | 5/2009 |
|---|---|---|
| JP | 2013205320 A | 10/2013 |
| JP | 2021004751 A | 1/2021 |

OTHER PUBLICATIONS

Office Action issued in Chinese Appln. No. 202211654544.0, mailed Jul. 21, 2025.

* cited by examiner

CLASSIFICATION CONDITION SETTING SUPPORT APPARATUS

CROSS-REFERENCE TO RELATED APPLICATIONS

This application is based on Japanese Patent Application No. 2022-009006 filed with the Japan Patent Office on Jan. 24, 2022, the entire contents of which are incorporated herein by reference.

FIELD OF THE INVENTION

The present invention relates to a classification condition setting support apparatus that supports setting of classification conditions for classifying defect types of an object to be inspected.

BACKGROUND ART

Conventionally, in visual appearance inspection, a defect generated in an object to be inspected is classified based on imaging information obtained by imaging the object to be inspected. Such classification of a defect type of the object to be inspected is performed by determining a feature amount acquired based on the imaging information and classification conditions including a threshold value or the like set for the feature amount, and determining whether the feature amount acquired based on the imaging information is equal to or greater than the threshold value or less than the threshold value according to the classification conditions. The feature amount and the threshold value constituting the classification conditions are determined so that the defect shown in the imaging information of the object to be inspected can be appropriately classified. Various methods have been proposed for determining such classification conditions (see, for example, JP 2006-266872 A, JP 2009-103508 A, and JP 2013-205320 A).

In order to optimize the classification conditions, the imaging information obtained by imaging the object to be inspected having the defect is confirmed in advance, and correct answer information is created by associating an appropriate defect type with each piece of imaging information. Then, by comparing a defect type obtained as a result of classifying the imaging information constituting the correct answer information according to the classification conditions with a defect type associated with the imaging information as the correct answer information, appropriateness/inappropriateness of the classification conditions is determined, selection of a feature amount and setting of a threshold value are adjusted, and the classification conditions are optimized.

However, as in the confirmation stage before mass production of the object to be inspected, when the number of defect occurrences increases, time required for the work of associating the defect type increases, and an error in the association easily occurs. In addition, when the number of defect types to be classified increases, the number of feature amounts constituting the classification conditions also increases, and analysis work for discussing an effective classification condition also becomes difficult. Therefore, it has been difficult to confirm the appropriateness/inappropriateness of the discussed classification conditions.

SUMMARY OF THE INVENTION

The present invention has been made in view of the problems above, and an object of the present invention is to provide information useful for setting classification conditions for classifying defect types of an object to be inspected.

The present invention for solving the problems above is a classification condition setting support apparatus and includes: a basic information storage unit configured to store basic information including basic imaging information associated with any of defect types and a basic defect type that is one of the defect types associated with each piece of the basic imaging information, the basic imaging information being imaging information acquired by imaging an object to be inspected; a classification condition setting unit configured to set a classification condition for classifying imaging information acquired by imaging the object to be inspected into any of the defect types; a basic defect type classification unit configured to classify the basic imaging information according to the classification condition; a classification result confirmation screen generator configured to generate a classification result confirmation screen including the number of pieces of classification basic imaging information that is the target basic imaging information classified into a predetermined defect type, the basic defect type associated with the classification basic imaging information, and the number of pieces of correct answer basic imaging information that is the number of pieces of the basic imaging information associated with the predetermined defect type among pieces of the target basic imaging information, by classifying the target basic imaging information that is at least a part of the basic imaging information according to the classification condition; and a display unit configured to display the classification result confirmation screen.

Accordingly, a result of classification of the basic imaging information stored in the basic information storage unit and associated with the defect type in advance by the basic defect type classification unit according to the classification conditions set by the classification condition setting unit is displayed on the display unit as the classification result confirmation screen. The basic defect type classification unit does not need to classify all the basic imaging information stored in the basic information storage unit, and thus may classify at least a part of the basic imaging information as the target basic imaging information. Then, the classification result confirmation screen includes the number of pieces of classification basic imaging information classified into a predetermined defect type according to the set classification conditions, the basic defect type associated in advance with the classification basic imaging information classified into the predetermined defect type, and the number of pieces of correct answer basic imaging information that is the number of pieces of basic imaging information associated in advance with the predetermined defect type among the pieces of target basic imaging information. By displaying such classification result confirmation screen, a user can clearly identify not only the number of pieces of the target basic imaging information that is correctly classified into the predetermined defect type among the pieces of target basic imaging information classified into the predetermined defect type, but also breakdown of the target basic imaging information erroneously classified into the predetermined defect type. Furthermore, since the number of pieces of correct answer basic imaging information is also displayed, the user can identify whether or not the target basic imaging information associated in advance with the predetermined defect type among the pieces of target basic imaging information has been appropriately classified without missing out. As described above, since the user can acquire the information for discussing the appropriateness/inappropriateness of the set classification conditions on the classification result confirmation screen, the classification condition setting support apparatus can provide the user with useful information for setting the classification conditions.

Furthermore, in the present invention, the classification result confirmation screen may include a classification basic imaging information index displayed in a mode according to the number of pieces of classification basic imaging information and in a mode according to the basic defect type associated with the classification basic imaging information.

In this way, in the classification basic imaging information index, a length, a size, a position, and the like of the classification basic imaging information index are displayed in different modes in correspondence to the mode according to the number of pieces of classification basic imaging information, for example, the number of pieces of classification basic imaging information. Therefore, it is possible to visually and easily identify the determination on the appropriateness/inappropriateness of the classification conditions. In addition, since the classification basic imaging information index is displayed in a mode according to the basic defect type associated in advance with the classification basic imaging information, for example, in a mode in which a color, a pattern, a shape, and the like of the classification basic imaging information index are different for each basic defect type, it is possible to visually and easily identify the determination on the appropriateness/inappropriateness of the classification conditions.

Furthermore, in the present invention, the classification result confirmation screen may include a mark indicating that the number of pieces of the classification basic imaging information displayed by the classification basic imaging information index matches the number of pieces of correct answer basic imaging information.

In this way, since the mark indicating that the number of pieces of classification basic imaging information displayed by the classification basic imaging information index displayed in the mode according to the number of pieces of classification basic imaging information matches the number of pieces of correct answer basic imaging information is included in the classification result confirmation screen, whether all pieces of basic imaging information included in the target basic imaging information and associated with a predetermined defect type are correctly classified can be visually and easily identified by comparing a display mode of the classification basic imaging information index with the mark.

Furthermore, in the present invention, the classification result confirmation screen may include a display region for displaying the classification basic imaging information index according to a number exceeding the number of pieces of correct answer basic imaging information.

In this way, since the classification result confirmation screen includes the display region for displaying the classification basic imaging information index according to the number exceeding the number of pieces of correct answer basic imaging information, even when all the basic imaging information included in the target basic imaging information and associated with the predetermined defect type in advance is correctly classified into the predetermined defect type, presence or absence of the target basic imaging information erroneously classified into the predetermined defect type due to overlooking can be visually and easily identified by the classification basic imaging information index.

Furthermore, the present invention may include a basic information generator configured to cause the display unit to display the imaging information acquired by imaging an object to be inspected with a defect, and receive an input of the defect type associated with the imaging information.

In this way, the user can easily acquire the basic information by associating the imaging information with the defect type while displaying and checking the imaging information on the display unit.

Furthermore, in the present invention, the classification condition setting unit may include at least one of an importance designation unit configured to receive designation of weighting for the defect type to be classified, a target defect designation unit configured to receive designation of the defect type to be classified by the basic defect type classification unit, and a feature amount designation unit configured to receive designation of a feature amount acquired based on the imaging information and used for classification by the basic defect type classification unit.

In this way, in order for the classification condition setting unit to set the classification conditions, the user can designate the weighting of the defect type, the defect type to be classified, and the feature amount to be used for classification. Therefore, the classification result in correspondence to the classification condition according to the purpose of the user can be confirmed on the classification result confirmation screen, and more useful information for setting the classification conditions can be obtained.

Moreover, in the present invention, the classification condition setting unit may set the feature amount and a threshold value of the feature amount based on a designation received through at least one of the importance designation unit, the target defect designation unit, and the feature amount designation unit.

In this way, it is possible to set the feature amount and the threshold value for classifying the defect type based on the feature amount according to the purpose without performing a complicated operation in which the user sets the feature amount and the threshold value for classifying the defect type based on the weighting of the defect type, the defect type to be classified, and the feature amount used for classification.

According to the present invention, it is possible to provide information useful for setting the classification conditions for classifying the defect type of the object to be inspected.

DETAILED DESCRIPTION

Application Examples

Hereinafter, application examples of the present invention will be described with reference to the drawings.

Figure 1:
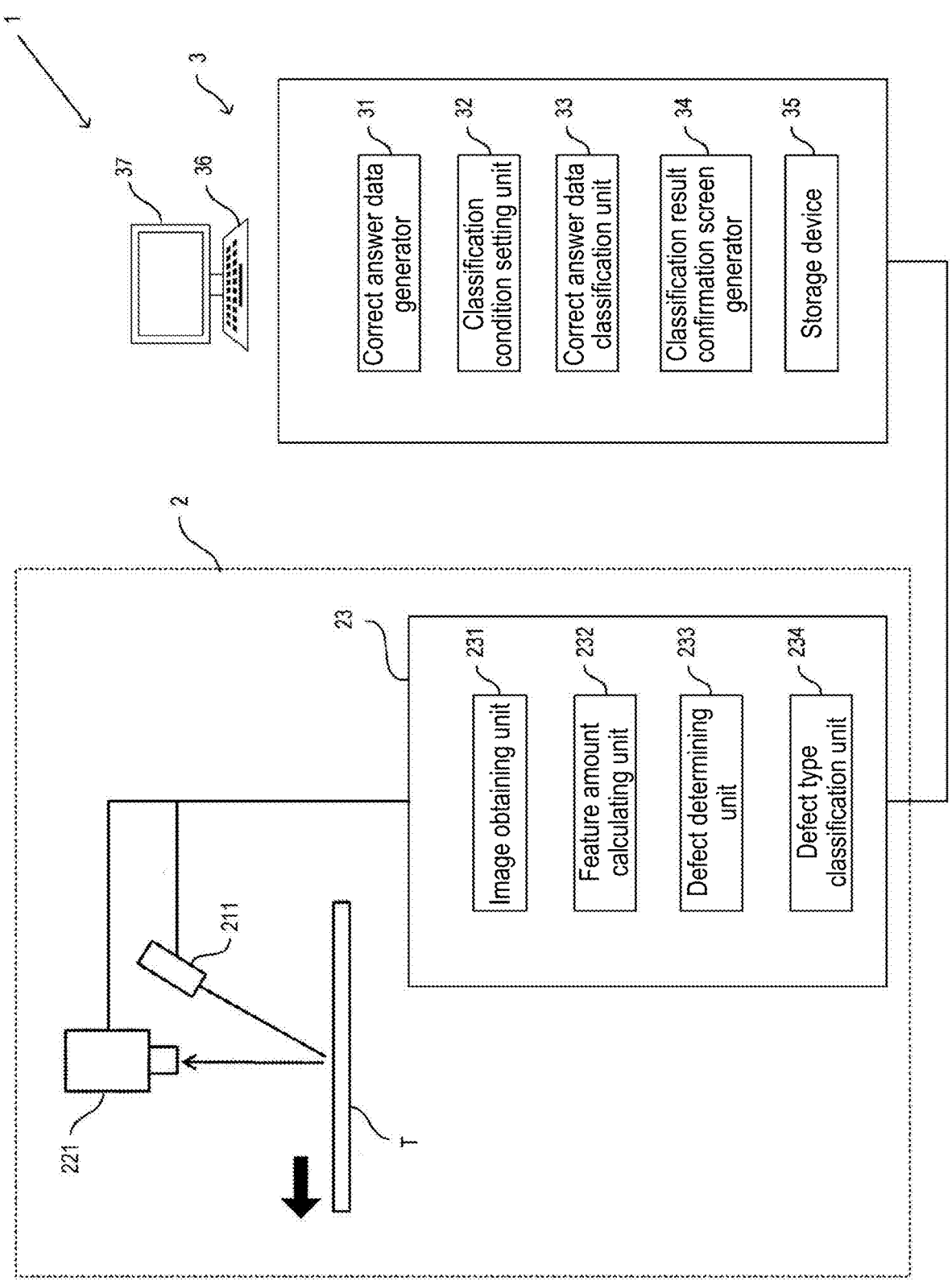
FIG. 1 is a schematic configuration diagram of a visual inspection management system according to an embodiment of the present invention.

FIG. 1 is a schematic configuration diagram of a visual inspection management system 1 to which the present invention is applied. The visual inspection management system 1 mainly includes a visual inspection apparatus 2 and an inspection management apparatus 3. The visual inspection apparatus 2 is an apparatus for acquiring an appearance image of a sheet-shaped object to be inspected T and detecting a defect based on the imaging. The visual inspection apparatus 2 is connected to the inspection management apparatus 3 via a network so as to be bidirectionally communicable.

In the visual inspection apparatus 2, when the defect type is classified based on the appearance image of the object to be inspected T in which the defect is detected, appropriate threshold values are set for various feature amounts (for example, a defect length, a defect width, and the like) acquired from the appearance image. In a case where classification conditions (also referred to as classification logic) including the feature amounts and the threshold values for such defect type classification are not appropriately set, an important defect may be missed out, and highly accurate defect detection becomes difficult. On the other hand, it is not easy to generate correct answer data for setting the classification logic by associating the appearance image with the defect type shown in the appearance image as the number of defects and the defect type increase. Therefore, in the visual inspection management system 1, at least a part of the correct answer data is classified according to the classification logic set based on the information input by a user, and the classification result is provided to the user as a classification result confirmation screen 6 to be described later, so that the appropriateness/inappropriateness of the set classification logic can be easily determined and evaluated.

Figure 4:
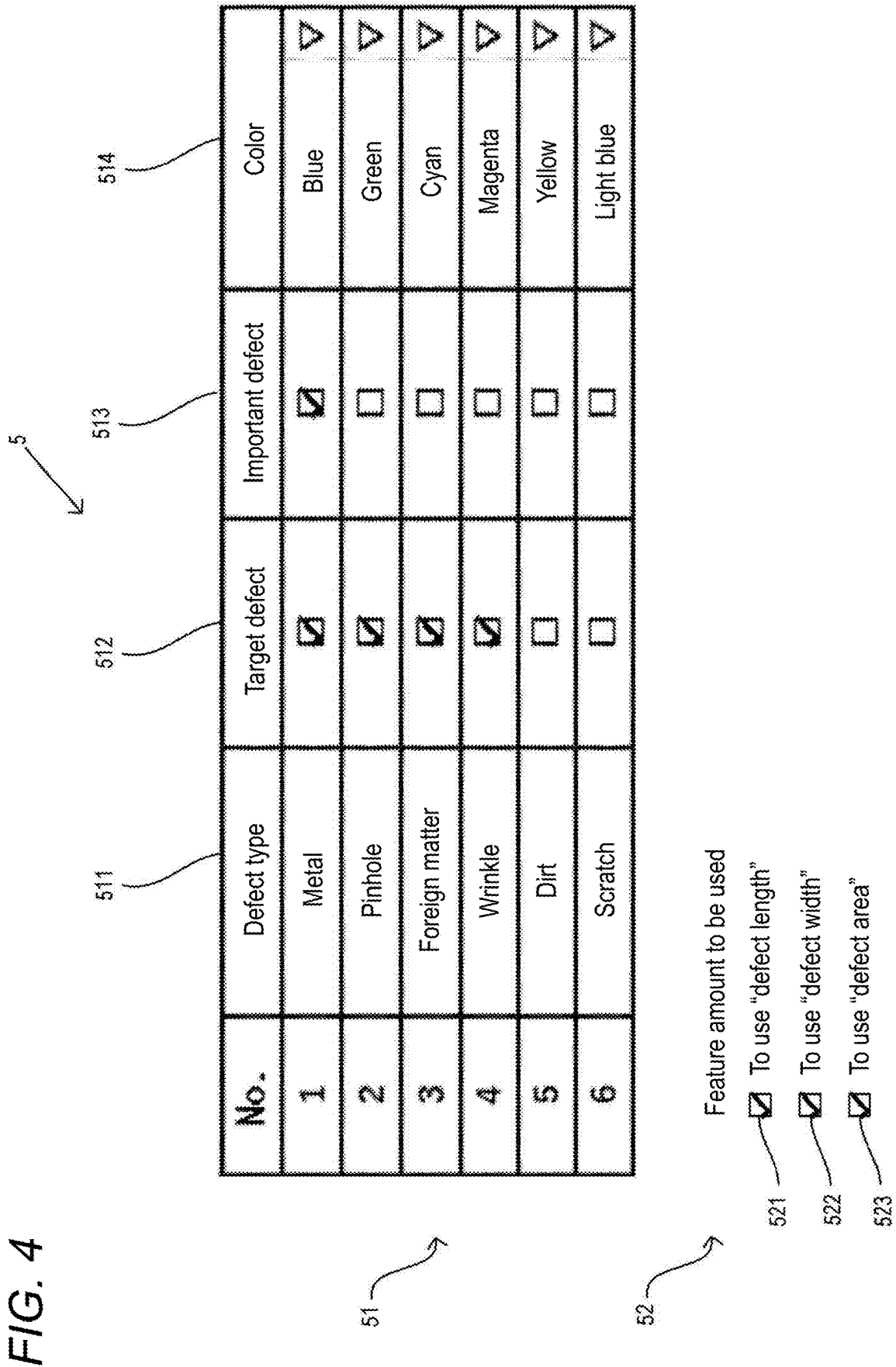
FIG. 4 is a diagram illustrating a display example of an input screen for setting a classification condition according to the embodiment of the present invention.

FIG. 4 illustrates a display example of an input screen 5 for the user to set the classification conditions. The user selects and designates a defect type to be classified from a plurality of defect types respectively numbered such as "metal" by checking a check box provided in a field of "target defect". In FIG. 4, four types of "metal", "pinhole", "foreign matter", and "wrinkle" are selected as classification targets. An item of "important defect" is provided on the input screen 5. The "important defect" refers to a defect type that the user considers to be particularly important among a plurality of defect types. In FIG. 4, the check box in the "metal" row has been checked. By designating the "important defect" in this way, the classification logic is set such that a defect type designated as the "important defect" is not missed out. Moreover, on the classification result confirmation screen 6, since display colors are set to be different for distinguishing each defect type, a pull-down menu for selecting the display color for each defect type has been provided. Furthermore, the input screen 5 is also provided with a check box for selecting and designating a feature amount to be used.

Figure 5:
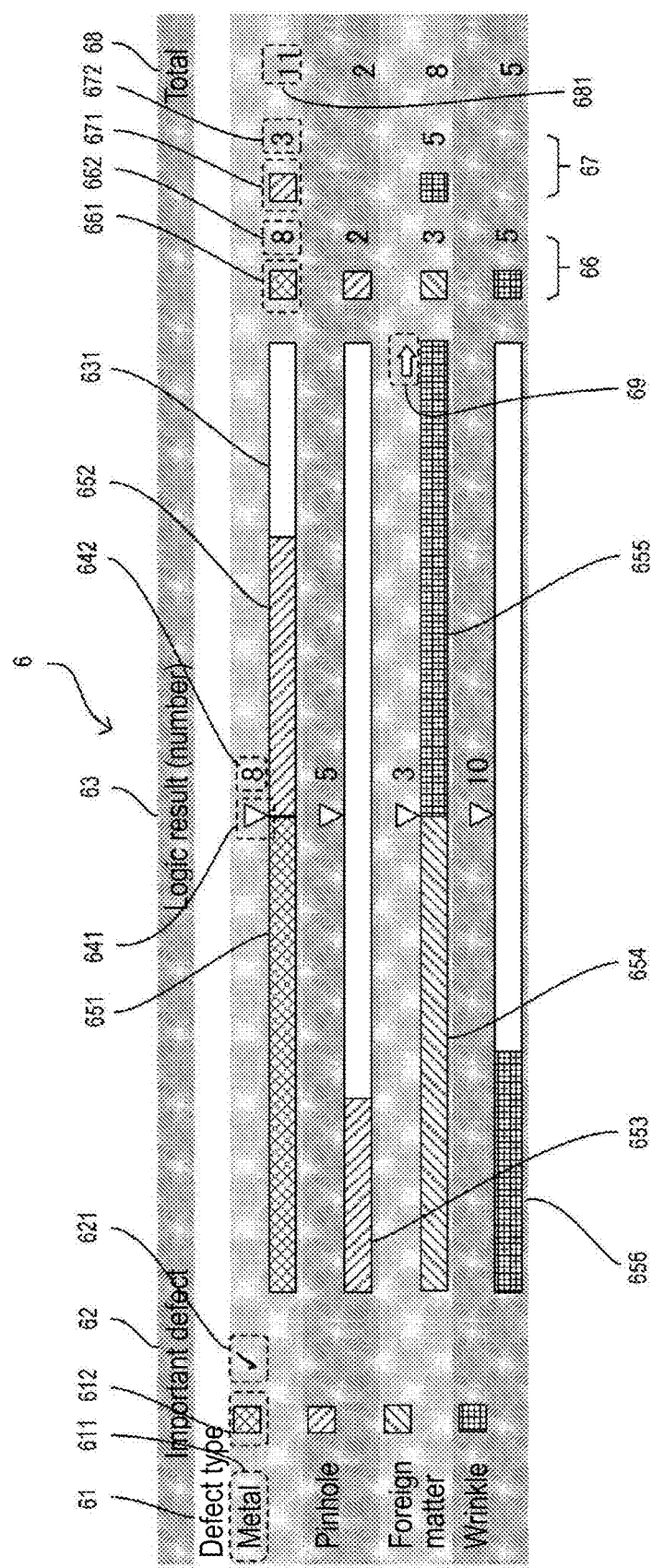
FIG. 5 is a diagram illustrating a display example of a classification result confirmation screen according to the embodiment of the present invention.

A result of classifying the correct answer data prepared in advance based on the information input via the input screen 5 is provided to the user as the classification result confirmation screen 6 illustrated in FIG. 5. Hereinafter, a configuration of the classification result confirmation screen 6 will be described using "metal" as an example.

The classification result confirmation screen 6 includes a defect type field 61, an important defect display field 62, a logic result (number) field 63, number display fields 66 and 67, and a total field 68. In the defect type field 61, a "metal" 611 as a defect type name and the display color (for convenience of notation, in FIG. 5, the colors are distinguished by shading instead of colors) of "metal" are displayed. Furthermore, in the important defect display field 62, a check mark 621 indicating that the "metal" is an important defect is displayed. The breakdown of the classification result by the classification logic is displayed by a logic result (number) field 63 and the number display fields 66 and 67. The number of pieces of image data classified as "metal" is indicated by bar-shaped indicators 651 and 652 displayed in a horizontally long display region 631 and numbers 662 and 672 displayed in the number display fields 66 and 67 together with squares 661 and 671 indicating the display colors. At the center of the display region 631, the number 642 of correct answers, that is, the number of pieces of image data associated with "metal" among the pieces of correct answer data to be classified is displayed as a number, and an inverted triangular mark 641 serving as a mark of the right end position of the indicator 651 when the classification result matches the number of correct answers is displayed. As illustrated in FIG. 5, the indicator 651 indicating that the correct answer type is "metal" reaches the position of the inverted triangular mark 641 from a left end of the display region 631. In addition, in the number display field 66, eight pieces of image data of which the correct answer type is "metal" are correctly classified into "metal", and coincide with "8" of the number 642 of correct answers displayed on the display region 631. Therefore, it is understood that "metal" is classified by the classification logic without missing out. In the display region 631 of "metal", the indicator 652 of the display color representing "pinhole" is also displayed. This indicates that the classification logic causes overlooking of "metal" and classifies "pinhole" as "metal". In this way, the number of pieces of image data of "pinholes" erroneously classified as "metal" can be accurately grasped from the number "3" in the number display field 67 and the square 671 displaying the display color indicating the defect type.

As described above, according to the classification result confirmation screen 6 illustrated in FIG. 5, it is possible to visually recognize at a glance which defect type is the important defect, whether or not it is correctly classified for each defect type including the important defect, whether or not it is missed out, and whether or not it is overlooked by the bar-shaped indicator 651 and the like and the number 642 of correct answers and the mark 641 provided in the display region 631, and it is possible to grasp the specific number of defects by the display of the number display fields 66 and 67. In addition, since the indicator 651 indicating the number of pieces of image data is color-coded for each correct answer type, the breakdown of the correct answer types of the image data classified into each defect type can be clearly identified by the classification logic. By displaying the classification result confirmation screen according to a plurality of classification logics on a display device 37 by paralleling or switching, and by comparing the classification results, it is possible to easily consider which classification logic is more appropriate according to purposes of inspection.

First Embodiment

Hereinafter, a configuration of the visual inspection management system 1 according to a first embodiment of the present invention will be described with reference to the drawings. However, the configuration of the apparatus described in this embodiment should be appropriately changed according to various conditions. In other words, the scope of the present invention is not intended to be limited to the following embodiment.

(Visual Inspection Management System)

FIG. 1 is a diagram schematically illustrating an overall configuration of the visual inspection management system 1 according to the embodiment of the present invention. The visual inspection management system 1 mainly includes the visual inspection apparatus 2 and the inspection management apparatus 3.

(Visual Inspection Apparatus)

The visual inspection apparatus 2 is an apparatus for acquiring an appearance image of a sheet-shaped article and detecting a defect based on the image, and includes an illumination system, a measurement system, a conveying mechanism (not illustrated), and a control terminal 23 as a main configuration.

The object to be inspected T is conveyed in a horizontal direction (an arrow direction) by the conveying mechanism (not illustrated), and an appearance image of the object to be inspected T is continuously acquired by the measurement system during the conveyance, and the inspection is performed based on the appearance image. The object to be inspected T is formed in a sheet shape, and examples thereof include paper, cloth, and films. Furthermore, a sheet body is not limited to a single material, and may be a sheet body having a plurality of layers such as a wrapping sheet in which a film and a nonwoven fabric are bonded. In addition, it may be a kind of food such as dried laver.

The illumination system includes a light source 211 that irradiates surfaces of the object to be inspected T with visible light (for example, white light). For these light sources, for example, LED lighting or the like may be used.

The measurement system includes a camera 221 that captures an image of light (hereinafter, referred to as a surface reflected light) emitted from the light source 211 and reflected on the surface of the object to be inspected T. Note that the camera includes a light receiving sensor capable of detecting light captured by each of the cameras, a lens, and a signal outputting unit, and outputs light detected by the light receiving sensor as an electric signal via the lens. As the sensor, for example, a CCD or CMOS sensor can be used.

An image of the object to be inspected irradiated with the illumination light from the light source 211 is captured by the camera 221, the captured image is subjected to image processing by the control terminal 23, and a portion having a feature amount deviating from the threshold values is determined as a defect by comparison between the obtained feature amount value and a preset inspection threshold value.

The control terminal 23 includes functional modules of an image obtaining unit 231, a feature amount calculating unit 232, a defect determining unit 233, and a defect type classification unit 234.

The image obtaining unit 231 functions as capturing an image from the camera 221, and obtains, for example, an image of the object to be inspected in a state with illumination light irradiated. The feature amount calculating unit 232 functions as calculating a feature amount used for visual appearance inspection based on the image of the object to be inspected. Note that the feature amount is not limited to one, and for example, various types of feature amounts such as a defect peak (%), a defect width (mm), a defect length (mm), a defect area (mm$^2$), brightness/darkness information, circularity, a Feret ratio, roundness, an extension degree, a density average value, a density pattern, a vertical density change, a horizontal density change, a planar density change, a hue (H) peak, a chroma(S) peak, a brightness (V) peak, an R peak (light), an R peak (dark), a G peak (light), a G peak (dark), a B peak (light), and a B peak (dark) may be calculated.

The defect determining unit 233 compares the feature amount calculated by the feature amount calculating unit 232 with a preset threshold value, and determines a portion having a feature amount deviating from the threshold values as a defect.

When a defect is detected from the object to be inspected by the determination of the defect determining unit 233, the defect type classification unit 234 classifies the type of the defect based on a predetermined threshold value and a feature amount of an image indicating the defect. The type of the classified defect can be arbitrarily set by the user, and for example, the type of metal, foreign matter, pinhole, streak, gel, resin, or the like is appropriately set. The defect is not limited thereto, and types such as dirt and wrinkles may be provided, or may be classified into more detailed types.

(Inspection Management Apparatus)

The visual inspection apparatus 2 described above is connected to the inspection management apparatus 3 via a network (LAN), and the visual inspection apparatus 2 and the inspection management apparatus 3 perform bidirectional communication of information. The inspection management apparatus 3 processes the information received from the visual inspection apparatus 2 and transmits information related to the inspection to the visual inspection apparatus 2. The inspection management apparatus 3 is configured by a general-purpose computer system including a CPU (not illustrated), a storage device 35, an input device 36, the display device 37, and the like. In addition, the storage device 35 stores at least defect image data transmitted from the visual inspection apparatus 2. Here, the defect image data includes supplementary information indicating the type and value of the feature amount obtained from the image of the portion determined as the defect of the object to be inspected, the authenticity of the primary inspection determined by the visual inspection, the type of the defect, and the like.

Note that the inspection management apparatus 3 may be configured by one computer or a plurality of computers. Alternatively, all or some of the functions of the inspection management apparatus 3 can be mounted on the control terminal 23 of the visual inspection apparatus 2. Or some of the functions of the inspection management apparatus 3 may be implemented by a server (such as a cloud server) on a network.

The inspection management apparatus 3 according to the embodiment includes, as functional modules, a correct answer data generator 31, a classification condition setting unit 32, a correct answer data classification unit 33, and a classification result confirmation screen generator 34. Here, the inspection management apparatus 3 corresponds to a classification condition setting support apparatus of the present invention. In addition, the correct answer data generator 31, the classification condition setting unit 32, the correct answer data classification unit 33, and the classification result confirmation screen generator 34 correspond to a basic information generator, a classification condition setting unit, a basic defect type classification unit, and a classification result confirmation screen generator of the present invention, respectively.

Figure 3:
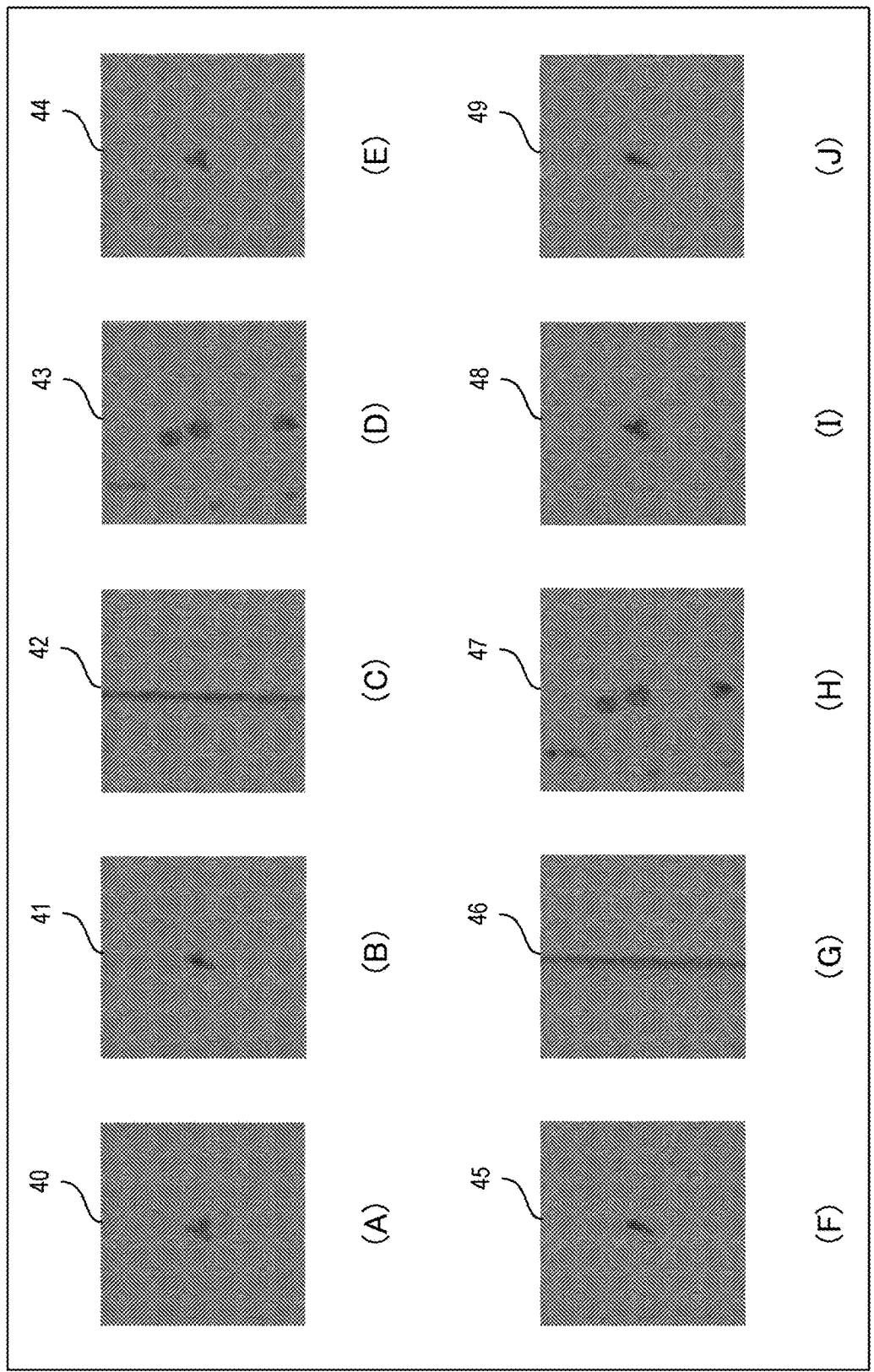
FIG. 3 is a diagram illustrating an example of image data according to the embodiment of the present invention.

The correct answer data generator 31 displays, on the display device 37, image data that is a captured image of the object to be inspected T stored in the storage device 35 and includes some defects, and receives an input of a defect type associated with the displayed image from the user via the input device 36. For example, a plurality of pieces of image data 40 to 49 as illustrated in FIG. 3 are displayed on the display device 37, and the user confirms the image data 40 to 49 and associates the defect type such as metal, foreign matter, pinhole, streak, gel, or resin with each piece of image data 40 to 49. In this way, correct answer data including the defect type associated with the image data is generated. The image data used for the correct answer data corresponds to the basic imaging information of the present invention, the defect type associated with the image data corresponds to the basic defect type of the present invention, and the correct answer data corresponds to the basic information of the present invention.

As will be described later, the classification condition setting unit 32 sets a classification condition under which the defect type can be appropriately classified based on the defect type, the important defect, the feature amount to be used, and the like that have been selected and designated by the user. The classification condition (classification logic) includes a combination of the feature amount described above and the threshold values for the feature amount. As a method of setting the classification logic based on the information selected and designated by the user, an appropriate method can be adopted. The classification condition (classification logic) corresponds to the classification condition of the present invention.

The correct answer data classification unit 33 classifies at least a part (all or some of them may be used) of the correct answer data stored in the storage device 35 into the defect type according to the classification logic set by the classification condition setting unit 32. At least a part of the correct answer data to be classified by the correct answer data classification unit 33 corresponds to the target basic information of the present invention.

The classification result confirmation screen generator 34 generates the classification result confirmation screen 6 including the result of classifying the correct answer data by the correct answer data classification unit 33 and causes the display device 37 to display the screen. A detailed configuration of the classification result confirmation screen will be described later. The classification result confirmation screen 6 corresponds to a classification result confirmation screen of the present invention.

Figure 2:
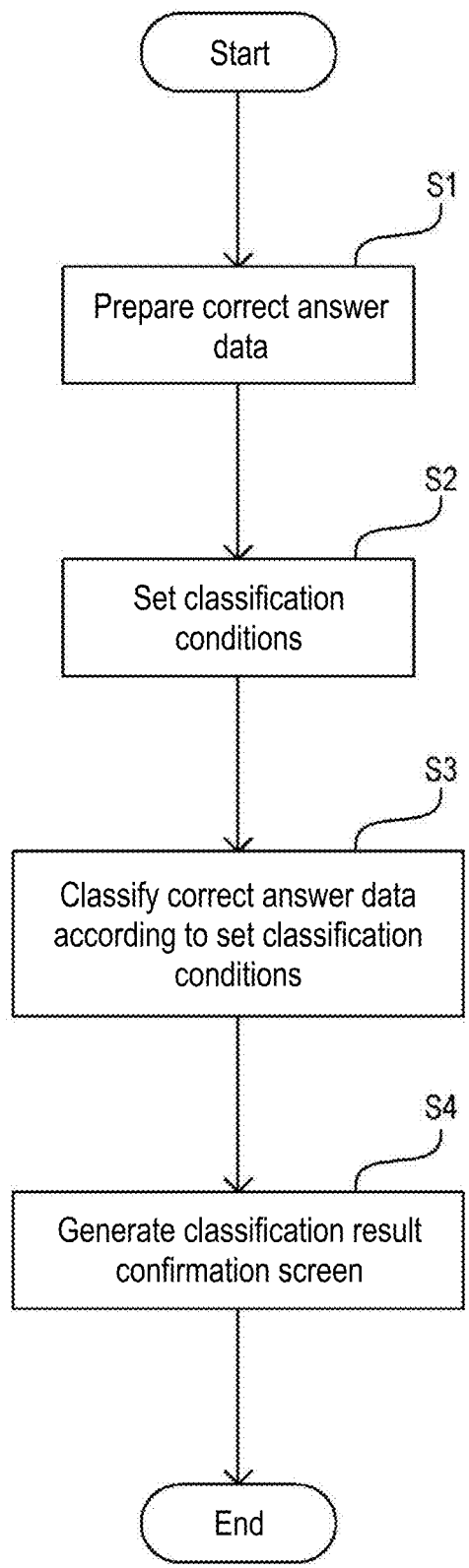
FIG. 2 is a flowchart illustrating a procedure of classification result confirmation processing according to the embodiment of the present invention.

FIG. 2 illustrates a procedure of classification result confirmation processing in the inspection management apparatus 3.

First, the correct answer data generator 31 receives an input of image data including a defect and a defect type associated with image data including some defects by the user (step S1). At this time, image information is acquired based on an image obtained by imaging the object to be inspected that has a defect in the visual inspection apparatus 2. The correct answer data generator 31 causes the display device 37 to display the plurality of pieces of image data 40 to 49 including the defect as illustrated in FIG. 3, and similarly receives the designation of the defect type to be associated from the plurality of defect type candidates displayed on the display device 37 by the user via clicking on the input device 36 or the like. The image information may include information other than images. Accordingly, the correct answer data for classifying the type of defect detected from the images of the object to be inspected is prepared. The generated correct answer data is stored in a predetermined area of the storage device 35. Here, a predetermined area of the storage device 35 that stores the correct answer data corresponds to the basic information storage unit of the present invention.

Next, the classification condition setting unit 32 sets the feature amounts and the threshold values constituting the classification conditions for classifying the defect type (step S2).

At this time, the user can select and designate a defect type or the like for which the classification result is desired to be checked in the visual inspection management system 1. FIG. 4 is the display example of the input screen 5 to be input by the user to set the classification conditions. A defect type designation field 51 in which a numbered defect type is displayed in each row is displayed in an upper portion of the input screen 5. Metal, pinholes, foreign matters, wrinkles, dirt, and scratches are displayed in the defect type field 511, but the defect type is not limited thereto. In the target defect field 512 in the third column of the input screen 5, check boxes for selecting and designating a defect type for which a classification result is desired to be checked as a "target defect" are displayed. By checking this check box, the user can select and designate a defect type to be checked on the classification result confirmation screen 6 to be described later. Here, metal, pinholes, foreign matters, and wrinkles are selected as target defects. Furthermore, a check box for selecting and designating an important defect is displayed in an important defect field 513 in the fourth column of the input screen 5. The important defect is a defect type determined to be particularly important by the user among the defect types to be detected. By selecting and designating the important defect in this way, the feature amounts and the threshold values are set such that the defect type designated as the important defect is not missed out when the classification conditions are set. Here, metal is selected as an important defect. A color designation field 514 is provided in the fifth column of the input screen 5. This allows the user to select a display color for each defect type in order to clearly distinguish the defect type when displaying the selected defect type on a classification result display screen to be described later, and an appropriate display color can be selected from the pull-down menu. Here, the metal, the pinholes, the foreign matters, and the wrinkles are set to be displayed in blue, green, cyan, and magenta, respectively. Furthermore, whether or not the defect is an important defect is weighted according to the defect type, and the important defect field 513 corresponds to an importance designation unit of the present invention. Moreover, the target defect field 512 corresponds to a target defect designation unit of the present invention.

In addition, a feature amount designation unit 52 for selecting and designating a feature amount to be used at the time of classifying the defect type is displayed at a lower portion of the input screen 5. In the feature amount designation unit 52, check boxes 521 to 523 for selecting and designating the feature amount are displayed. Here, whether or not to use "defect length", "defect width", and "defect area" as the feature amount can be selected via the check box. The feature amount that can be selected and designated is not limited thereto. Here, the feature amount designation unit 52 corresponds to the feature amount designation unit of the present invention.

As described above, the classification condition setting unit 32 searches for the classifiable feature amounts and the threshold values based on the defect target, the important defect type, and the feature amount to be used that have been selected and designated by the user through the input screen 5, and sets the feature amounts and the threshold values suitable for the classification of the selected target defect and the important defect.

Next, according to the classification condition set in step S2, the correct answer data classification unit 33 classifies the image data included in the correct answer data prepared in step S1 (step S3). The classification result is stored in a predetermined area of the storage device 35. The image data to be classified by the correct answer data classification unit 33 may include the data of the defect image stored in the storage device 35.

Next, the classification result confirmation screen generator 34 generates the classification result confirmation screen 6 illustrated in FIG. 5 based on the classification result of the correct answer data in step S3 and displays the screen on the display device 37 (step S4).

FIG. 5 illustrates the classification result confirmation screen 6. In FIG. 5, the display relating to "metal" is particularly denoted by a reference numeral, but in the following description, similar configurations of other defect types will be denoted by similar reference numerals.

A defect type name classified in the column direction is displayed as a defect type field 61 on the left end of the classification result confirmation screen 6. Here, the "metal" 611, "pinhole", "foreign matter", and "wrinkle" selected on the input screen illustrated in FIG. 3 are displayed. In the defect type field 61, a square 612 of a color used to display the defect type designated on the input screen illustrated in FIG. 3 is displayed together with these defect type names. However, in FIG. 5, the defect type is distinguished by the type of shading instead of the color. Here, each of the defect types displayed in the defect type field 61 corresponds to a predetermined defect type of the present invention.

An important defect display field 62 is provided on the right side of the defect type field 61. A check mark 621 indicating that the defect is an important defect is displayed in "metal" designated as the important defect on the input screen illustrated in FIG. 3.

Then, on the right side of the important defect display field 62, the number of classification results by the classification logic used for classification of the defect type is displayed as a logic result (number) field 63. Here, the number is the number of pieces of image data classified into each defect type displayed at the left end of the classification result confirmation screen 6. The number is represented by bar-shaped indicators 651 to 656 displayed in the horizontally long display region 631. These indicators 651 to 656 each have a length proportional to the number of correspondent defect types. Furthermore, at the center of the display region 631, the number of pieces of image data (the number of correct answers) associated with the defect type included in the classified image data is indicated by a number 642 and the inverted triangular mark 641 indicating a position in the display region 631. As the indicator (for example, the indicator 651) displayed in the display region 631, first, the indicator 651 indicating the number of pieces of image data associated with the defect type that is displayed in the defect type field 61 is displayed so as to extend from the left end of the display region 63 to the right side. An indicator of the erroneously classified defect type (for example, the indicator 652) is displayed adjacent to the right side of the indicator 651 indicating the number of pieces of correctly-classified image data and extending further to the right side. When there are a plurality of defect types associated with the image data that is erroneously classified into a certain defect type, an indicator is further displayed adjacent to the right side for each defect type. In the indicator (for example, the indicator 651) indicating the number of pieces of image data associated with the defect type correctly classified into each defect type, when the number matches the number of correct answers, the end portion of the indicator 651 matches the position of the mark 641 at the center of the display region 631. Therefore, the user can easily identify the presence or absence of missing out and overlooking based on the positional relationship between the right end of the indicators 651 and the mark 641. Note that the number of pieces of image data for each defect type included in the image data to be classified differs depending on the defect type, but since the mark 641 indicating the number of correct answers is provided at the center of the display region 631, the number of pieces of image data that can be displayed in the display region of each defect type row differs, and the length (unit length) of each indicator displayed in each defect type row also differs. As described above, the display region 631 is provided so as to be able to display the indicators having a length corresponding to the number exceeding the number of correct answers of each defect type. Here, the display region 631 corresponds to the display region of the present invention. Furthermore, the mark 641 corresponds to the mark of the present invention. Moreover, the indicators 651 to 656 correspond to the classification basic imaging information indexes of the present invention, the lengths of the indicators 651 to 656 correspond to modes corresponding to the number of pieces of classification basic imaging information of the present invention, and the display colors (shadings in FIG. 5) of the indicators 651 to 656 correspond to modes corresponding to the basic defect type associated with the classification basic imaging information of the present invention. And the number 642 in the number of correct answers corresponds to the number of correct answer basic imaging information of the present invention. Furthermore, the number represented by the lengths of the indicators 651 to 656 corresponds to the number of classification basic imaging information of the present invention.

Moreover, on the right side of the display region 631, the number display fields 66 and 67 for displaying the number of pieces of image data classified into each defect type are provided. In the number display field 66, the number 662 indicating the number of pieces of image data correctly classified into the defect type displayed in the defect type field 61 and the square 661 in a color indicating the defect type (the correct answer type) associated in advance with each piece of image data are displayed. In the number display field 67, the square 671 and the number 672 in colors representing the correct answer types of image data erroneously classified as the defect type that is displayed in the defect type field 61 are displayed. Then, the total field 68 is provided at the right end of the classification result confirmation screen 6, and the total number 681 of image data classified into the defect type is displayed for each defect type. The numbers 662 and 672 in the number display fields 66 and 67 and the total number 681 in the total field 68 correspond to the number of pieces of classification basic imaging information of the present invention.

In FIG. 5, the total field 68 indicates that there are 11 pieces of image data classified as metal in total according to the classification logic. In addition, the number display fields 66 and 67 and the indicators 651 and 652 indicate that the image data classified as metal includes eight pieces of image data of which the correct answer type is metal and three pieces of image data of which the correct answer type is pinhole. Since the number 642 of correct answers displayed at the center of the display region 63 is 8, and the indicators 651 indicating the image data of which the correct answer type is metal has reached the position of the inverted triangular mark 641, the user can clearly visually recognize that all the image data of which the correct answer type is metal are correctly classified into metal. Furthermore, in the classification logic, in addition to the image data of which the correct answer type is metal, the user can clearly visually recognize that the image data of which the correct answer type is pinhole is also erroneously classified as metal by the color-coding of the indicators 651 and the indicator 652 and the number display fields 66 and 67. In other words, in the classification logic, it can be seen that overlooking at metal occurs, and as a breakdown thereof, the image data of the pinhole as the correct answer type is classified as metal. Since the user has designated metal as an important defect, overlooking of the metal is not acceptable, but there are cases where overlooking may be acceptable. In addition, since it is known from the display which correct answer type of image data is overlooked, it is possible to easily determine the appropriateness/inappropriateness of the classification logic, more specifically, the combination of the feature amount and the threshold value with reference to these pieces of information.

In FIG. 5, according to the classification logic, there are two pieces of image data classified as pinholes, and the indicator 653 does not reach the inverted triangular mark 641 at the center, so that the user can clearly visually recognize that overlooking has occurred for the pinholes. Among the five pieces of image data of which the correct answer type is the pinhole, three pieces that are not correctly classified are erroneously classified as the metal as described above, and the user can clearly visually identify them by the display of the number 642 of correct answers at the center of the display region 63 and the indicators 653 and 631 and the number display fields 66 and 67 of the rows of the respective defect types.

In FIG. 5, the total field indicates that there are eight pieces of image data classified as foreign matters by the classification logic. Furthermore, it can be seen from the number display fields 66 and 67 and the indicators 654 and 655 that the image data classified as the foreign matter includes three pieces of image data of which the correct answer type is the foreign matter and five pieces of image data of which the correct answer type is the wrinkle. Since the number of correct answers displayed in the center of the display region is 3 and the indicator 654 indicating the image data of which the correct answer type is the foreign matter has reached the position of the inverted triangle, the user can clearly visually identify that all the image data of which the correct answer type is foreign matter are correctly classified as the foreign matter. Furthermore, in the classification logic, in addition to the image data of which the correct answer type is the foreign matter, the image data of which the correct answer type is the wrinkle is also classified as the foreign matter, which can be clearly visually identified by the user via the color-coding of the indicators 654 and 655 and the number display fields 66 and 67. Since the number of correct answers of the foreign matters is three, there are only six display regions of the indicators of the foreign matters, and the display region 631 for displaying the indicators 655 having a length corresponding to five pieces of image data of which the correct answer type is wrinkle is not provided. Therefore, it is indicated by a rightward arrow 69 that there is a portion of the indicator 655 that exceeds the display region 631 and is not displayed. Accordingly, the user can understand that the foreign matter can be correctly classified in the classification logic, but overlooking might occur.

Then, in FIG. 5, according to the classification logic, the number of pieces of image data of which the correct answer type is wrinkle is ten, and the user can clearly identify that five pieces of the image data are correctly classified and the other five are erroneously classified as foreign matters.

As described above, according to the classification result confirmation screen 6 illustrated in FIG. 5, it is possible to visually recognize at a glance which defect type is the important defect, whether or not it is correctly classified for each defect type including the important defect, whether or not it is missed out, and whether or not it is overlooked by the bar-shaped indicator 651 and the like and the number 642 of correct answers and the mark 641 provided in the display region 631. Also, it is possible to grasp the specific number of defects by the display of the number display fields 66 and 67. Furthermore, since the indicator 651 or the like indicating the number of pieces of image data is color-coded for each correct answer type, the breakdown of the correct answer type of the image data classified into each defect type can be clearly identified according to the classification logic.

FIG. 5 illustrates the classification result confirmation screen indicating the result of classifying the image data by one classification logic, but the classification result is also different by changing the classification logic, that is, the feature amounts and the threshold values used for classification of the image data. Therefore, by displaying the classification result confirmation screen according to the plurality of classification logics on the display device 37 in parallel or by switching and also by comparing the classification results, it is possible to easily discuss which classification logic is more appropriate according to the purposes of inspection.

In the classification result confirmation screen 6 illustrated in FIG. 5, the length of the bar-shaped indicator displayed in the horizontally long display region 631 indicates the number of pieces of image data. Such an indicator is an example of the classification basic imaging information index of the present invention, and the classification basic imaging information index, a mode according to the number of pieces of classification basic information, and a mode according to the basic defect type are not limited thereto.

<Supplementary Note 1>

A classification condition setting support apparatus (3), including: a basic information storage unit (35) configured to store basic information including basic imaging information associated with any of defect types and a basic defect type that is one of the defect types associated with each piece of the basic imaging information, the basic imaging information being imaging information acquired by imaging an object to be inspected (T); a classification condition setting unit (32) configured to set a classification condition for classifying imaging information acquired by imaging the object to be inspected (T) into any of the defect types; a basic defect type classification unit (33) configured to classify the basic imaging information according to the classification condition; and a display unit (37) configured to display a classification result confirmation screen (6) including the number of pieces of classification basic imaging information that is the target basic imaging information classified into a predetermined defect type, the basic defect type associated with the classification basic imaging information, and the number of pieces of correct answer basic imaging information that is the number of pieces of the basic imaging information associated with the predetermined defect type among pieces of the target basic imaging information, by classifying the target basic imaging information that is at least a part of the basic imaging information according to the classification condition.

The invention claimed is:

1. A classification condition setting support apparatus comprising:
- a basic information storage unit configured to store basic information including basic imaging information associated with any of defect types and a basic defect type that is one of the defect types associated with each piece of the basic imaging information, the basic imaging information being imaging information acquired by imaging an object to be inspected;
- a classification condition setting unit configured to set a classification condition for classifying imaging information acquired by imaging the object to be inspected into any of the defect types;
- a basic defect type classification unit configured to classify the basic imaging information according to the classification condition;
- a classification result confirmation screen generator configured to generate a classification result confirmation screen including the number of pieces of classification basic imaging information that is the target basic imaging information classified into a predetermined defect type, the basic defect type associated with the classification basic imaging information, and the number of pieces of correct answer basic imaging information that is the number of pieces of the basic imaging information associated with the predetermined defect type among pieces of the target basic imaging information, by classifying the target basic imaging information that is at least a part of the basic imaging information according to the classification condition; and
- a display unit configured to display the classification result confirmation screen, wherein
the classification result confirmation screen includes a display region allocated to each of the predetermined defect type which displays a classification basic imaging information index displayed in a length according to the number of pieces of classification basic imaging information and in a mode according to the basic defect type associated with the classification basic imaging information.

2. The classification condition setting support apparatus according to claim 1, wherein the classification result confirmation screen includes a mark indicating that the number of pieces of the classification basic imaging information displayed by the classification basic imaging information index matches the number of pieces of correct answer basic imaging information in the display region.

3. The classification condition setting support apparatus according to claim 1, wherein the classification result confirmation screen includes a display region for displaying the classification basic imaging information index according to a number exceeding the number of pieces of correct answer basic imaging information in the display region.

4. The classification condition setting support apparatus according to claim 1, further comprising a basic information generator configured to cause the display unit to display the imaging information acquired by imaging an object to be inspected with a defect, and receive an input of the defect type associated with the imaging information.

5. The classification condition setting support apparatus according to claim 1, wherein the classification condition setting unit includes at least one of an importance designation unit configured to receive designation of weighting for the defect type to be classified, a target defect designation unit configured to receive designation of the defect type to be classified by the basic defect type classification unit, and a feature amount designation unit configured to receive designation of a feature amount acquired based on the imaging information and used for classification by the basic defect type classification unit.

6. The classification condition setting support apparatus according to claim 5, wherein the classification condition setting unit sets the feature amount and a threshold value of the feature amount based on a designation received through at least one of the importance designation unit, the target defect designation unit, and the feature amount designation unit.

* * * * *